US010228733B2

(12) United States Patent
Cocchini et al.

(10) Patent No.: US 10,228,733 B2
(45) Date of Patent: Mar. 12, 2019

(54) CABLE CASSETTE APPARATUS

(71) Applicant: International Business Machines Corporation, Armonk, NY (US)

(72) Inventors: Matteo Cocchini, Long Island City, NY (US); Michael A. Cracraft, Poughkeepsie, NY (US); Khaalid P. J. McMillan, Wappingers Falls, NY (US); Arushi Shahani, Poughkeepsie, NY (US); John G. Torok, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/945,869

(22) Filed: Apr. 5, 2018

(65) Prior Publication Data

US 2018/0224907 A1    Aug. 9, 2018

Related U.S. Application Data

(62) Division of application No. 15/071,440, filed on Mar. 16, 2016, now Pat. No. 10,095,278.

(51) Int. Cl.
*G06F 1/18* (2006.01)

(52) U.S. Cl.
CPC .................... *G06F 1/183* (2013.01)

(58) Field of Classification Search
CPC ........ G06F 1/183; G06F 1/182; G06F 1/1633; G06F 1/1658; G06F 1/1683
See application file for complete search history.

(56) References Cited

U.S. PATENT DOCUMENTS

| 6,351,343 B1 | 2/2002 | Nakagawa et al. |
| 6,840,801 B1 * | 1/2005 | Behl .................. G06F 1/183 |
| | | 439/541.5 |

(Continued)

FOREIGN PATENT DOCUMENTS

| CN | 104880783 B | 12/2016 |
| DE | 202004004198 U1 | 7/2004 |

(Continued)

OTHER PUBLICATIONS

Cocchini et al., "Cable Cassette Apparatus," U.S. Appl. No. 15/071,440, filed Mar. 16, 2016.

(Continued)

*Primary Examiner* — Hoa C Nguyen
*Assistant Examiner* — Keith DePew
(74) *Attorney, Agent, or Firm* — Robert J. Shatto

(57) ABSTRACT

An apparatus includes a cassette. The cassette includes a carriage. The carriage is retained internally to the cassette. The apparatus further includes a booklet assembly. The booklet assembly includes a cable connector. The cable connector is affixed internally to the booklet assembly. The cassette is configured for insertion into the booklet assembly. The apparatus further includes a cable assembly. The cable assembly is configured for insertion into the cable connector. The carriage is configured for retaining the cable assembly. In an aspect, a method of using the apparatus includes preloading the cable assembly into the carriage, inserting the cassette into the booklet assembly, and configuring the carriage such that the cable assembly is inserted into the cable connector and retained in an inserted position by the carriage.

3 Claims, 11 Drawing Sheets

(56) References Cited

U.S. PATENT DOCUMENTS

| | | | |
|---|---|---|---|
| 7,150,644 B2* | 12/2006 | Behl | G06F 1/183 439/374 |
| 7,206,201 B2* | 4/2007 | Behl | G06F 1/184 340/507 |
| 7,724,529 B2* | 5/2010 | Oyama | G06F 1/183 361/725 |
| 9,405,334 B2* | 8/2016 | Gong | G06F 1/183 |
| 10,019,044 B2 | 7/2018 | Cocchini et al. | |
| 2003/0147231 A1 | 8/2003 | Chen | |
| 2005/0052826 A1* | 3/2005 | Yi | G06F 1/181 361/636 |
| 2007/0059975 A1 | 3/2007 | Walsh | |
| 2011/0221362 A1 | 9/2011 | Cao et al. | |
| 2011/0228496 A1 | 9/2011 | Huang et al. | |
| 2013/0163179 A1 | 6/2013 | Ma et al. | |
| 2014/0080341 A1 | 3/2014 | Brodsky et al. | |
| 2014/0169145 A1 | 6/2014 | Bunker et al. | |
| 2015/0044911 A1 | 2/2015 | Wu et al. | |
| 2015/0318642 A1 | 11/2015 | Lee et al. | |
| 2016/0050795 A1 | 2/2016 | Conn et al. | |
| 2016/0057887 A1 | 2/2016 | Conn et al. | |
| 2017/0045702 A1 | 2/2017 | Petersen et al. | |
| 2017/0269643 A1* | 9/2017 | Cocchini | G06F 1/183 |
| 2017/0322603 A1* | 11/2017 | Cocchini | G06F 1/183 |

FOREIGN PATENT DOCUMENTS

| | | |
|---|---|---|
| KR | 1020070028739 A | 3/2007 |
| TW | M413174 U | 10/2011 |

OTHER PUBLICATIONS

Cocchini et al., "Cable Cassette Apparatus," U.S. Appl. No. 15/662,776, filed Jul. 28, 2017.

Cocchini et al., "Cable Cassette Apparatus," U.S. Appl. No. 15/945,848, filed Apr. 5, 2018.

Cocchini et al., "Cable Cassette Apparatus," U.S. Appl. No. 15/945,853, filed Apr. 5, 2018.

Cocchini et al., "Cable Cassette Apparatus," U.S. Appl. No. 15/945,857, filed Apr. 5, 2018.

Cocchini et al., "Cable Cassette Apparatus," U.S. Appl. No. 15/945,869, filed Apr. 5, 2018.

Cocchini et al., "Cable Cassette Apparatus," U.S. Appl. No. 15/945,881, filed Apr. 5, 2018.

List of IBM Patents or Patent Applications Treated as Related, Dated Mar. 28, 2018, 2 pages.

* cited by examiner

CABLE CASSETTE APPARATUS

BACKGROUND

The present invention relates generally to the field of tools and equipment for use with computer cabinets, and more particularly to apparatus for managing cables that connect to interface cards in computer cabinets.

Computer servers and other systems are often installed in cabinets, racks, or other support structures. Such computer systems often require various cables to be connected to ports mounted on or in the computer chassis within the cabinet or other rack. Cable connectors may be incorporated into printed circuit board devices (i.e., "cards") that interface with larger computer systems. As signal transmission rates for cabling in server environments grow and new performance limitations are reached, Engineers and designers continue to face challenges in managing and extending cable connections.

SUMMARY

An apparatus includes a cassette. The cassette includes a carriage. The carriage is retained internally to the cassette. The apparatus further includes a booklet assembly. The booklet assembly includes a cable connector. The cable connector is affixed internally to the booklet assembly. The cassette is configured for insertion into the booklet assembly. The apparatus further includes a cable assembly. The cable assembly is configured for insertion into the cable connector. The carriage is configured for retaining the cable assembly.

In an aspect, the cassette is inserted into and retained within the booklet assembly, and said cable assembly is inserted into the cable connector and retained in an inserted position by the carriage. In an aspect, the booklet assembly conforms to a form factor, the booklet assembly includes a card, and the card is of reduced length relative to the form factor. The cassette 220 may be understood as filling a length difference between the card 204 and the form factor, which corresponds to the size of the booklet assembly 200. In an aspect, the cable assembly is a preexisting cable assembly.

In an aspect, a method of using the apparatus includes preloading the cable assembly into the carriage, inserting the cassette into the booklet assembly, and configuring the carriage such that the cable assembly is inserted into the cable connector and retained in an inserted position by the carriage. In an aspect of the method of using the apparatus, the booklet assembly is configured for insertion into a device cabinet, the device cabinet houses a computer system, the booklet assembly further includes a backplane connector, the backplane connector is configured to connected to a backplane socket, the backplane socket is in electronic communication with the computer system, and the method further includes inserting the booklet assembly into the device cabinet such that the backplane connector is inserted into the backplane socket.

In an aspect, an apparatus includes a cassette. The cassette includes a cassette base. The cassette base includes a cassette base top surface, a cassette base front edge, a cassette base rear edge, a cassette base right edge, and a cassette base left edge. The cassette further includes a cassette front panel, a cassette rear panel, a cassette right panel, and a cassette left panel. The cassette front panel is affixed to the cassette base front edge, orthogonal to the cassette base top surface. The cassette rear panel is affixed to the cassette base rear edge, orthogonal to the cassette base top surface. The cassette right panel is affixed to the cassette base right edge, orthogonal to the cassette base top surface. The cassette left panel is affixed to the cassette base left edge, orthogonal to the cassette base top surface. The cassette front panel includes a front panel gap cut therefrom. The cassette further includes a carriage. The carriage includes a carriage panel. The carriage panel includes a carriage panel top face and a carriage panel bottom face. The carriage further includes at least one hook structure affixed to the carriage panel top face. The carriage is retained to the cassette base such that the cassette base top surface opposes the carriage panel bottom surface. The front panel gap and the carriage are aligned along an insertion dimension.

DETAILED DESCRIPTION

Figure 1:
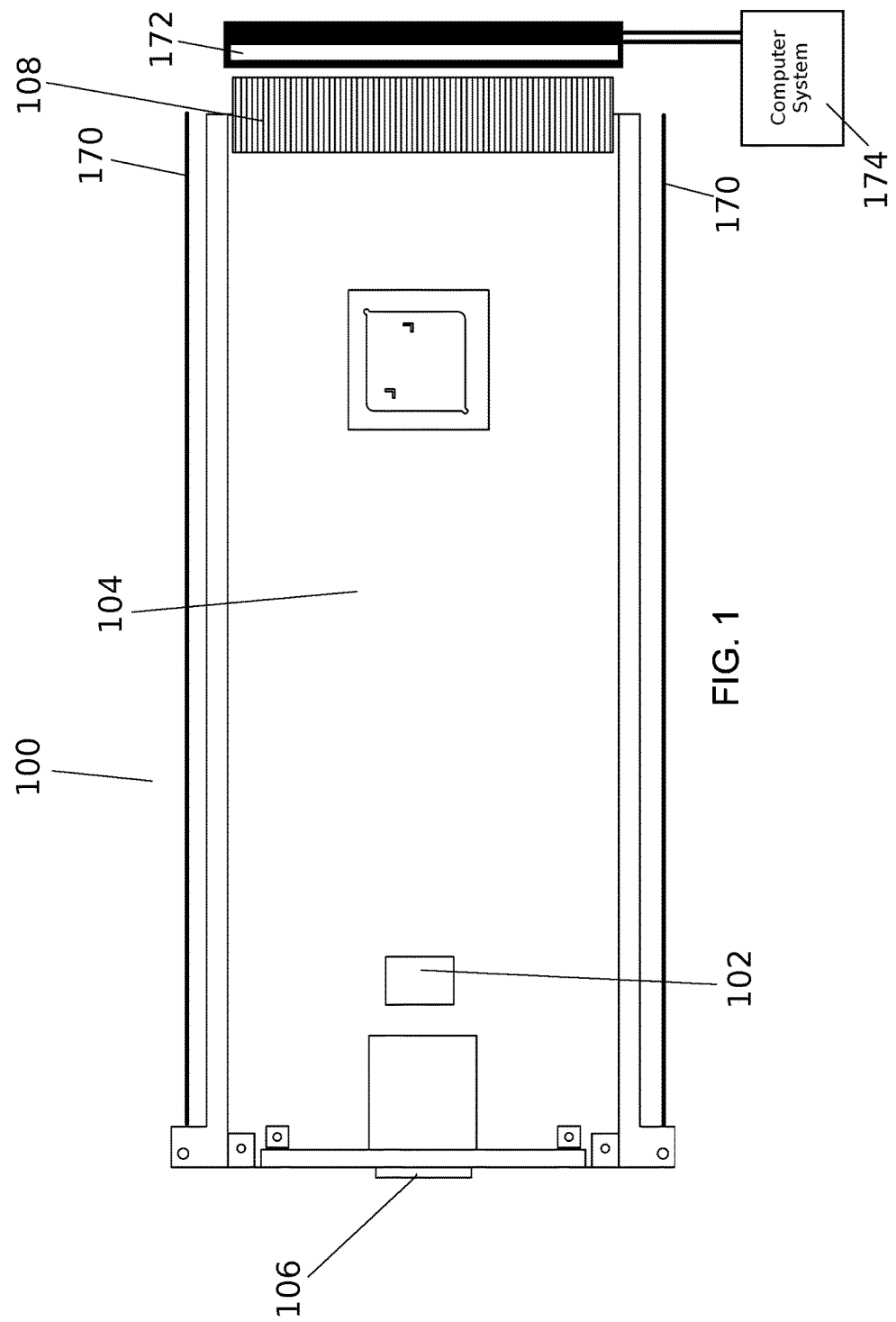
FIG. 1 is a plan view of a full length card in the context of schematically represented cabinet and computer system environment, in accordance with at least one embodiment of the invention.

Referring now to the invention in more detail, FIG. 1 is a plan view of a booklet assembly, generally designated 100, which is configured for insertion into a device cabinet 170. The device cabinet 170 is schematically represented by a pair of parallel lines. The device cabinet 170 may include rails, guides, slides, slots or other mounting structures suitable for receiving the booklet assembly 100. In an embodiment, the device cabinet 170 is the back of a rack mounted server installation, as may be found in a computer data center. In an embodiment, the booklet assembly 100 includes hardware appropriate for mounting a card 104 into the particular device cabinet 170. The card 104 may be understood as a Printed Wiring Board (PWB) or, equivalently, a Printed Circuit Board (PCB) upon which various electronic components may be mounted for electronic interface with a computer system 174 (schematically represented as a box). The device cabinet 170 houses the computer system 174. Example computer hardware systems where embodiments of the present invention may be applied include IBM® z System® servers and cabinets.

In an embodiment, the booklet assembly 100 further includes a backplane connector 108. The backplane connector 108 may be incorporated into the card 104, and may provide electronic communication to various components mounted to the card 104. In an embodiment, the backplane connector 108 is configured to connect to a backplane socket 172, and the backplane socket 172 is in electronic communication with the computer system 174. The backplane connector 108 and the backplane socket 172 may be of the type commonly found as expansion board connectors in commercially available computer systems. In alternative embodiments, the backplane connector 108 may be incorporated into a side of the booklet assembly 100, ninety degrees offset from its depicted position, as is the case in various desktop computer systems, and the structures disclosed elsewhere may be modified accordingly.

Figure 2:
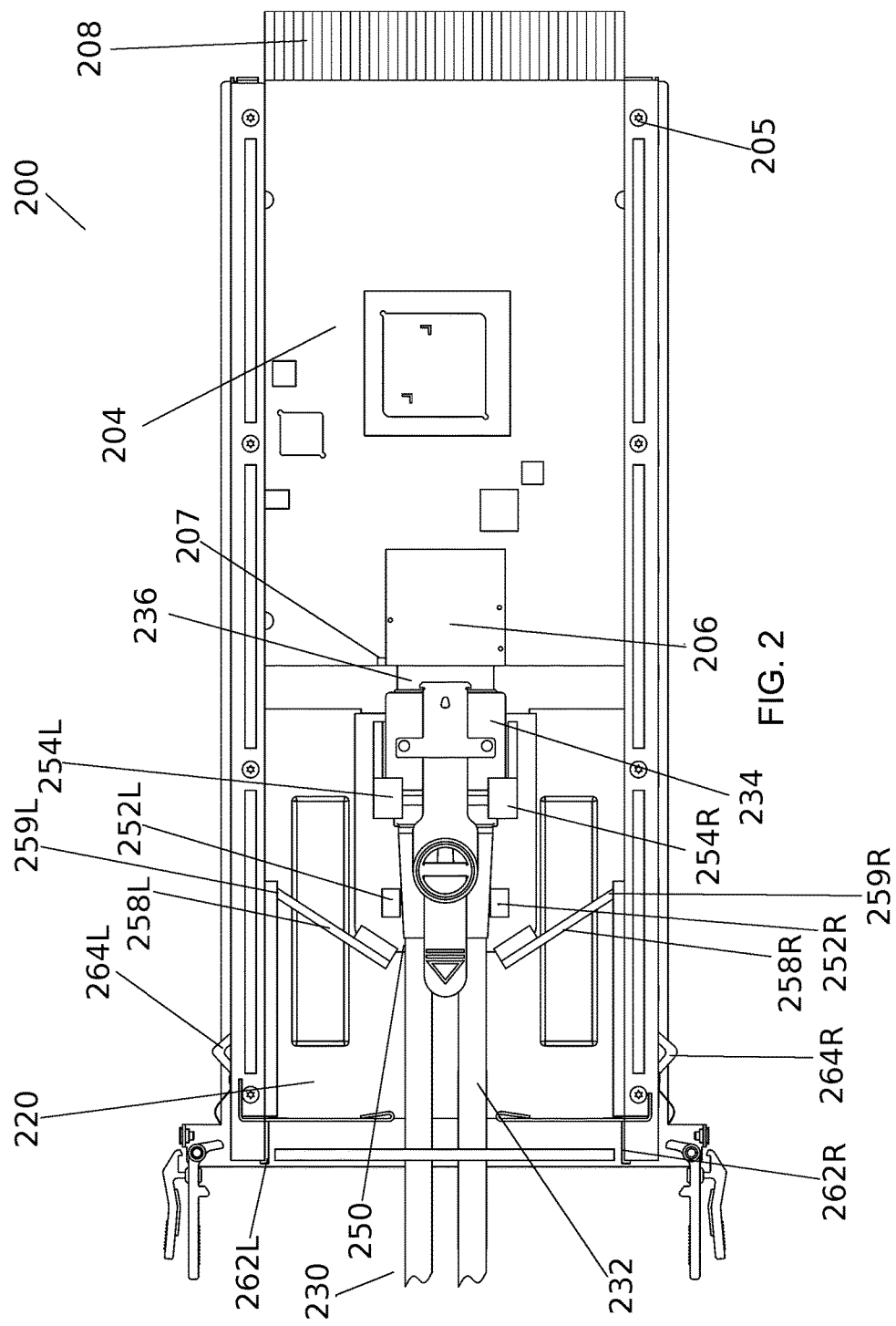
FIG. 2 is a plan view of a cable assembly, cassette, and reduced form factor card, in accordance with at least one embodiment of the invention.
Figure 3A:
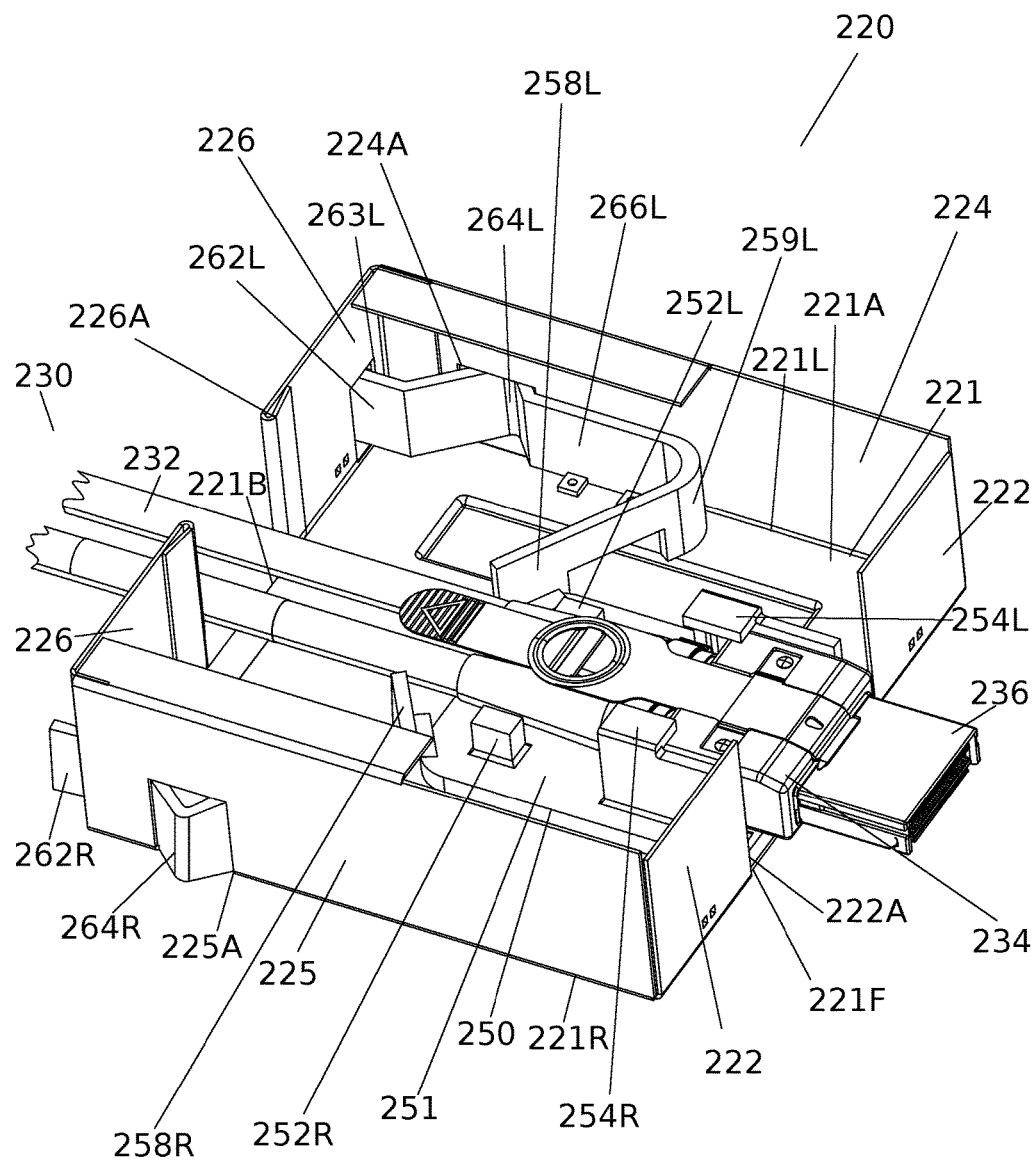
FIG. 3A is an elevated right-front perspective view of a cable assembly and cassette, in accordance with at least one embodiment of the invention.
Figure 3B:
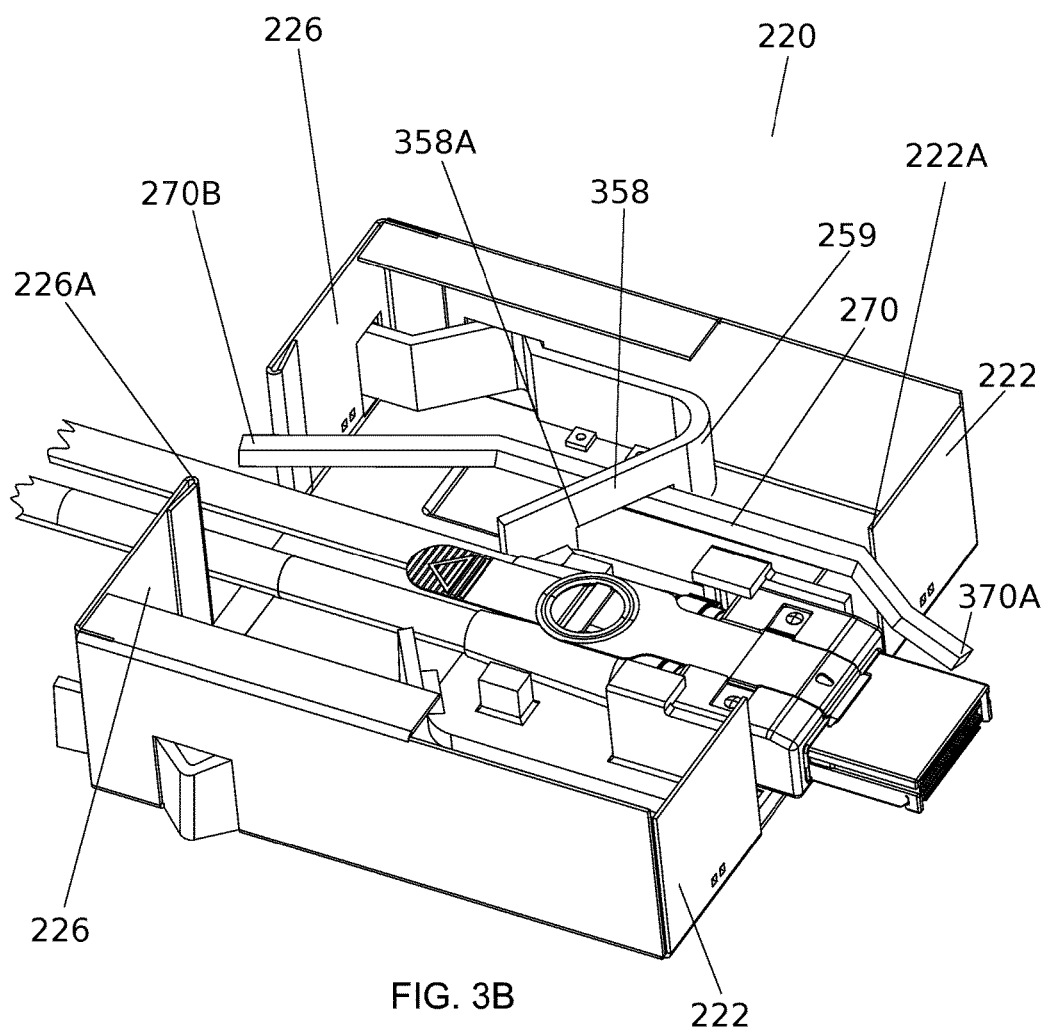
FIG. 3B is an elevated right-front perspective view of a cable assembly and cassette with a light pipe, in accordance with at least one embodiment of the invention.

Referring still to FIG. 1, the card 104 may include a cable connector 106, which may connect to one or more types of cable connectors, whereby communication between the computer system 174 and other computer systems or devices is enabled. The card 104 may conform to a large form factor consistent with the size of the booklet 100. The inventors have observed and/or recognized that, where the primary function of the card 104 is to facilitate communication via the cable connector 106 by the computer system 174, due to recent reductions in the size and cost of integrated circuit chips, as well as recent increased needs to improve signal integrity performance and/or reduce the cost of manufacture, the card 104 may be substantially reduced in length relative to a given form factor to which the booklet 100 conforms. For example, FIG. 2 depicts a card 204 that is of reduced length relative to the full length card 104. The length of the card 104 necessitates the use of a retimer chip 102 to coordinate signals across the PWB of the card 104. By reducing the length of the card 104, the retimer chip 102 may no longer be necessary, and the resulting short card (e.g., the card 204) may be less fragile than the full length card 104, thereby requiring less structural support from the booklet 100.

The resulting short card 204 may also be less costly to produce and distribute, consume less power, require fewer capacitors (e.g., filtering, blocking, and/or decoupling capacitors), and have simple thermal management than the full length card 104. However, the inventors have observed and/or recognized that the short card 204 necessitates bringing the cable connector 106 inside the booklet 100, which puts the cable at risk of damage by contacting potentially sharp internal structures of the booklet 100 and/or device cabinet 170. This may also put the cable at risk of accidental disconnection, if internal components place unexpected tension on the cable. Similarly, moving the cable connector 106 inside the booklet 100 creates a risk of altering airflow through the device cabinet 170 in unexpected ways. The inventors have observed and/or recognized that a system can incorporate the benefits of a short card without the drawbacks of a cable connector deep inside the booklet by providing a cassette into which a preexisting cable assembly may be preloaded and/or pre-retained. It should be noted, however, that no particular aspect of the aforementioned benefits of short cards, drawbacks of long cards, drawbacks of internally mounted cable connectors, or benefits of cassettes need necessarily be present in any particular embodiment of the invention.

FIGS. 2-4C collectively depict various views and components for one or more embodiments of the present invention. FIGS. 2 presents a plan view of a cable assembly, cassette, and reduced form factor card, in accordance with at least one embodiment of the invention. In the depicted embodiment, the card 204 is mounted internally to the booklet assembly 200. Mounting may be accomplished with any appropriate fastener, such as the depicted screws 205; alternatives include nails, adhesives, bolts, and rivets. A backplane connector 208 is integrated into the card 204, and a cable connector 206 is mounted thereon, both in electronic communication with the card 204, its components, and any computer system that may be connected via the backplane connector 208. The cable connector 206 may be understood as being affixed internally to the booklet assembly 200, regardless of whether, in alternative embodiments, a card 204 is present or not. The apparatus of the depicted embodiment includes a cassette 220. The cassette 220 is shown isolated from the booklet assembly 200 at FIG. 3A.

Referring still to an embodiment depicted in FIGS. 2-4C, the cassette 220 retains a cable assembly 230. The cable assembly 230 includes a cable 232, which connects electrically, optically, or otherwise to a cable head assembly 234, which includes a connector jack 236. The cable assembly 230 is configured for insertion into the cable connector 206 via the connector jack 236. The cable assembly 230, as depicted, is a PCIe cable assembly. In alternative embodiments, the present invention may be applied to other standard or non-standard cable types that may be usefully connected to the card 204, such as Ethernet, Universal Serial Bus (USB), etc. Various embodiments may include custom cable types and/or embodiment-specific cable types. Embodiments that use a preexisting cable assembly 230, specifically a cable that is manufactured and commercially available off-the-shelf and conforming to one or more defined standards, may benefit in that such embodiments require only the manufacture of the cassette 220, with other components already available (though this advantage is not a necessarily a requirement for any particular embodiment).

Referring still to an embodiment depicted in FIGS. 2-4C, the cassette 220 includes a carriage 250, which includes at least one hook structure, in a depicted embodiment including a rear right hook structure 252R, a rear left hook structure 252L, a front right hook structure 254R, and a front left hook structure 254L. The carriage may be made of various rigid or semi-rigid metal or plastic materials. The carriage 250 is retained internally to the cassette 220. As described herein, "retained" includes not only completely fixed configurations, but also includes configurations where movement in various dimensions is permitted, subject to mechanical restriction. The carriage may 250 may be understood as including a carriage panel with a carriage panel top face 251 to which the hook structures 252R, 252L, 254R, and 252L may be understood as affixed to or monolithically incorporated into the carriage panel top face 251. The four hook structures 252R, 252L, 254R, and 252L are shaped to conform to the cable head assembly 234 such that the cable head assembly 234 is retained to the carriage 250, as depicted. Thus, the carriage 250 may be understood as being configured for retaining the cable assembly 230. In alternative embodiments, different numbers and shapes of retaining structures may be incorporated into and/or affixed to the carriage 250, and such structures may accommodate the same shaped cable assembly 230 differently or may accommodate a differently shaped cable assembly 230, for example a cable assembly conforming to a different cabling standard.

Referring still to an embodiment depicted in FIGS. 2-4C, the cassette 220 includes a cassette base 221. The cassette base 221 may be a flat (or about flat, permissive of holes, raised regions depressed regions, etc.) rectangular (or about rectangular, permissive of indentations, outcroppings, fabrication errors, etc.) structure of rigid or semi-rigid material, such as sheet metal. The cassette base 221 includes a cassette base top surface 221A (in the drawings, the cassette base 221 refers to the three dimensional panel while the cassette base top surface 221A refers to its two dimensional top surface), a cassette base front edge 221F, a cassette base right edge 221R, a cassette base rear edge 221B, and a cassette base left edge 221L. Alternative shapes of the cassette base 221 and the cassette 220 as a whole are contemplated, for example where the device cabinet 170 accepts an alternatively shaped booklet 100.

Referring still to an embodiment depicted in FIGS. 2-4C, affixed to or incorporated monolithically into the cassette base 221, perpendicularly and upward thereto along the cassette base front edge 221F is a cassette front panel 222, which incorporates a full-height or partial height front panel gap 222A. The front panel gap 22A accommodates the connector jack 236. More, fewer, or differently shaped gaps may be incorporated into the cassette front panel 222, as required to accommodate differently shaped jacks or other components. Affixed to or incorporated monolithically into the cassette base 221, perpendicularly and upward thereto along the cassette base rear edge 221B is a cassette rear panel 226, which incorporates a full or partial height cassette rear panel central gap 226A. The cassette rear panel central gap 226A accommodates the cable 232. The edges of the cassette rear panel central gap 226A may be folded over, as shown, or, alternatively, the edges may be smoothed, sanded, rounded, or otherwise rendered non sharp, which reduces the risk of shearing the cable 232. More, fewer, or differently shaped gaps may be incorporated into the cassette rear panel 226, as required to accommodate differently shaped cables or other components. As shown, a cassette rear panel left gap 263 and cassette rear panel right gap 264 may also be cut into the cassette rear panel 262, as described in further detail below.

Referring still to an embodiment depicted in FIGS. 2-4C, affixed to or incorporated monolithically into the cassette base 221, perpendicularly and upward thereto along the cassette base right edge 221R is a cassette right panel 225, and affixed to or incorporated monolithically into the cassette base 221, perpendicularly and upward thereto along the cassette base left edge 221L is a cassette left panel 224. The cassette right panel 225 may have cut therefrom a cassette right panel gap 225A, and the cassette left panel 224 may have cut therefrom a cassette left panel gap 224A. More, fewer, or differently shaped gaps cut from the cassette left panel 224 and cassette right panel 225 are also contemplated.

Referring still to an embodiment depicted in FIGS. 2-4C, FIG. 4A introduces an insertion dimension 400. The front panel gap 222A and the carriage 250 are aligned along the insertion dimension 400. The carriage 250 may be retained to the cassette base 221 such that the cassette base top surface 221A opposes the carriage panel bottom surface 451, and that the carriage 250 is translationally movable along the insertion dimension 400, relative to the cassette 220, and the cable assembly 230 inserts into the cable connector 206 along the insertion dimension 400. Thus, the cable assembly 230, retained to the carriage 250, may be adjusted positionally relative to the cassette 220 to obtain and retain optimal mating between the connector jack 236 and the cable connector 206. The carriage 250 may be urged along the insertion dimension 400 thus pressing the connector jack 236 into the cable connector. In a depicted embodiment, one possible urging means for urging the connector jack 236 into the cable connector 206 includes a left lever and a right lever. The left lever includes a left lever arm region 258L and a left lever fulcrum region 259L. The right lever includes a right lever arm region 258R and a right lever fulcrum region 259R. Each of the two levers may be configured to urge the carriage 250 forward along the insertion dimension by spring action. Thus, the cassette 220 may be understood to include at least one spring-loaded member (one of the levers, including the left and right lever arm regions 258L and 258R) affixed internally thereto, and the at least one spring-loaded member may be understood as being configured to urge the carriage 250 along the insertion dimension such that the cable assembly is urged into an inserted position.

Accordingly, the levers may be made of an intrinsically deformable material, such as various metal or plastic materials that have spring properties. The levers may be constructed as a single piece with various other elements described below, and the single piece may be retained to the cassette 220 by one or more snap fasteners 402, which may retain the lever and associated components to the cassette 220. Alternative fasteners include screws, nails, bolts, adhesives, hook-and-loop fabric, etc.

Figure 4A:
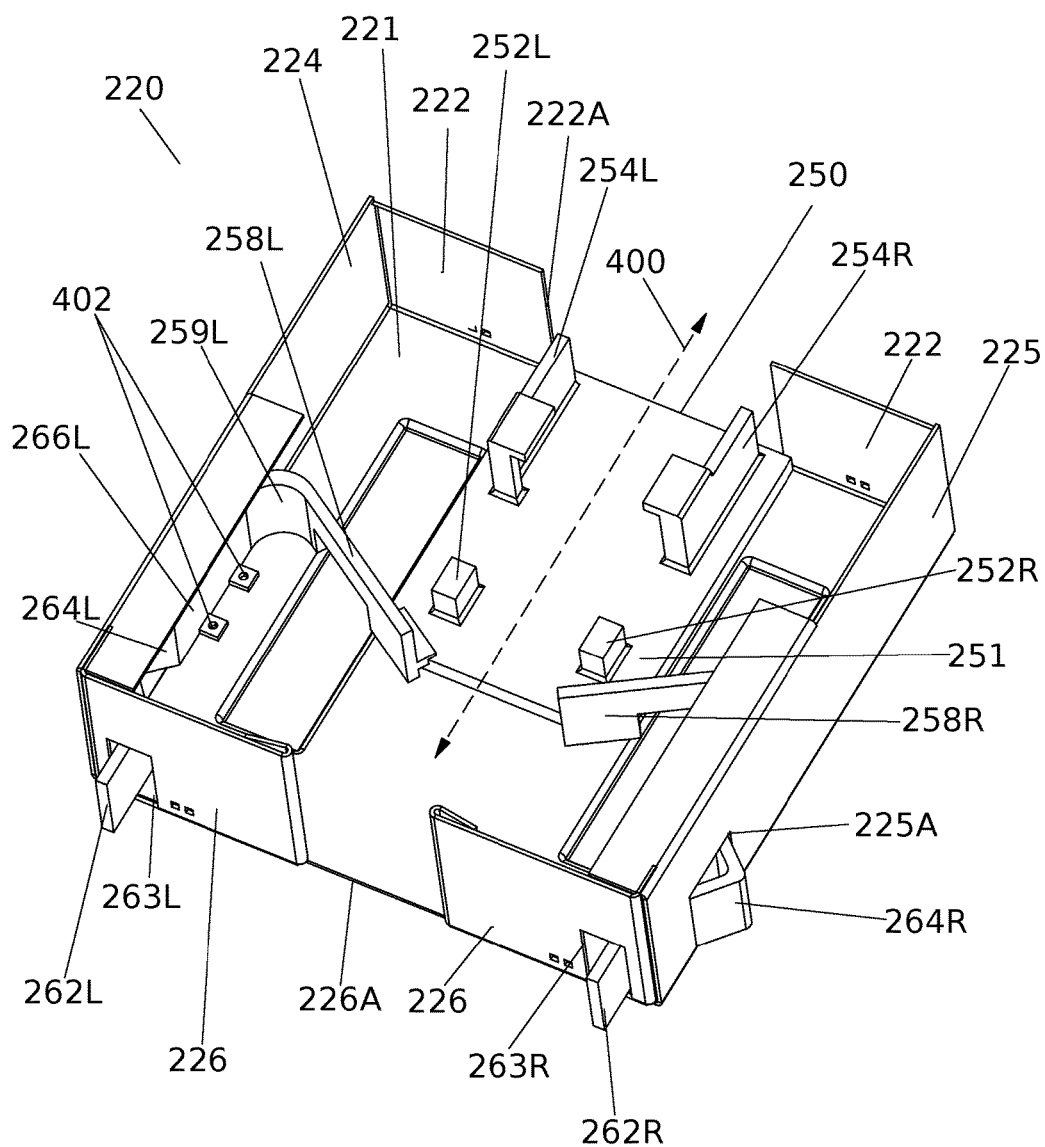
FIG. 4A is an elevated right-rear perspective view of a cassette, in accordance with at least one embodiment of the invention.
Figure 4B:
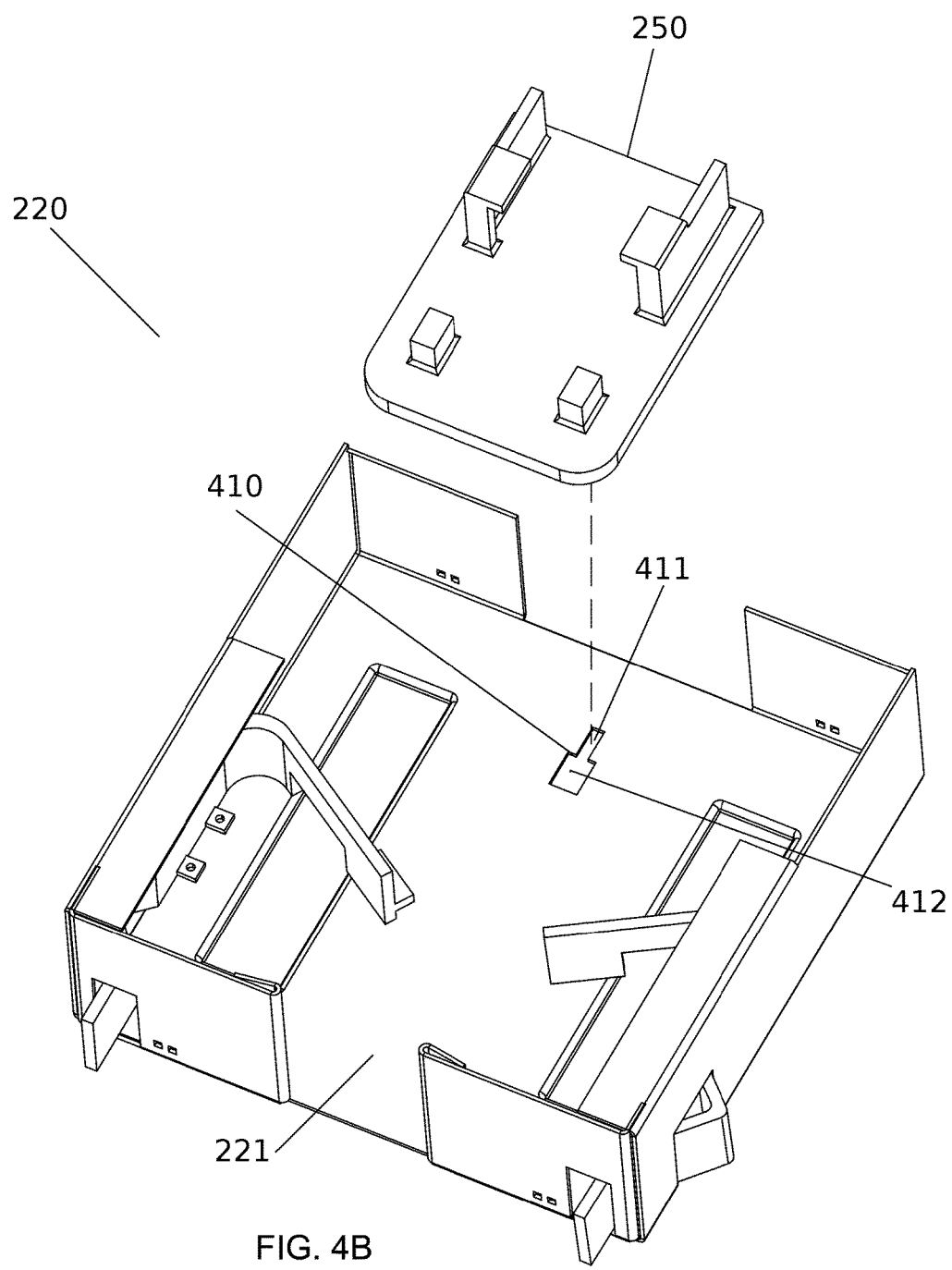
FIG. 4B is an elevated right-rear perspective view of a cassette with carriage in expanded position, in accordance with at least one embodiment of the invention.
Figure 4C:
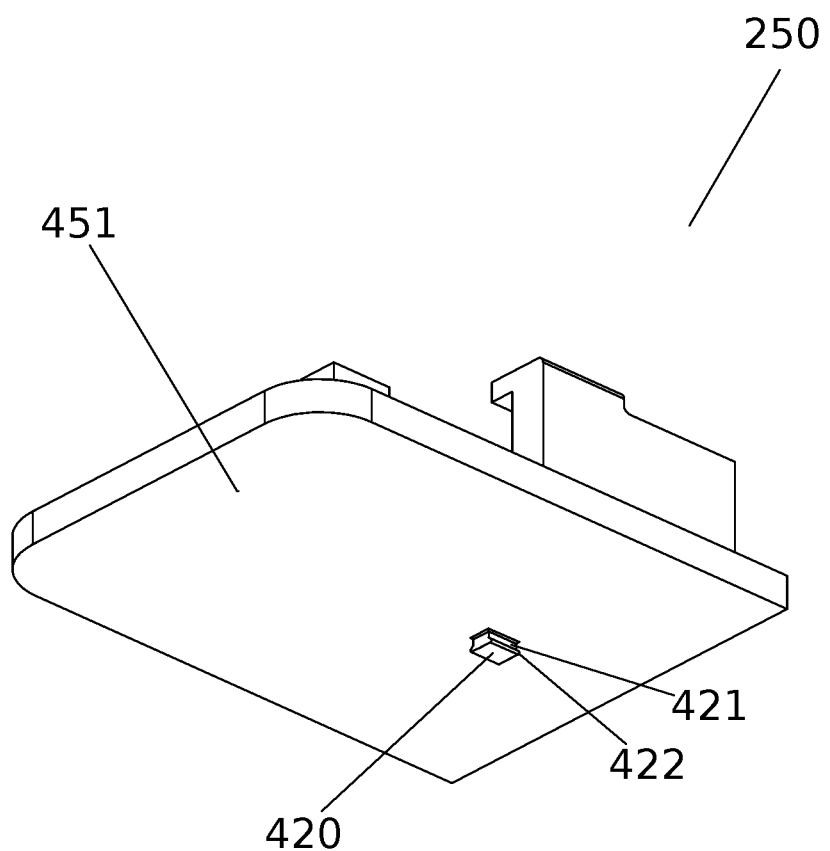
FIG. 4C is a lowered, right-rear perspective view of a carriage, in accordance with at least one embodiment of the invention.

Referring still to an embodiment depicted in FIGS. 2-4C, FIG. 4B depicts how translational movability of the carriage 250 along the insertion dimension 400 may be achieved incorporating into the cassette base 221 a slot 410. The slot 410 includes a first slot region 412 and a second slot region 411. The first slot region 412 is wider than the second slot region 411, as depicted. FIG. 4C depicts the carriage panel bottom face 451. The carriage 250 further includes a tongue 420 affixed to or incorporated monolithically thereto, for example via the carriage panel bottom face 451. The tongue 420 includes a narrow region 421 and an enlarged region 422. The narrow region 421 is affixed between the enlarged region 422 and the carriage panel bottom face 451, such that the tongue 420 has a T-shaped profile, as shown. The enlarged region 422 is of lesser width than the second slot region 411 and greater width than the first slot region 412. The narrow region 421 is of lesser width than the second slot region 411. Thus, in a depicted embodiment, the tongue 420 is insertable into the first slot region 412 and slidable into the second slot region 411 such that, when the tongue 420 is disposed within the second slot region 411, the carriage 250 is retained to the cassette base 221 slidably, along the insertion dimension 400. Thus, the tongue 420 may be understood as configured for insertion into and retention by the slot 410 such that the tongue is restricted to motion along the insertion dimension 400.

Referring still to an embodiment depicted in FIGS. 2-4C, the cassette 220 is configured for insertion into the booklet assembly 200. In some configurations of a depicted embodiment, the cassette 220 is inserted into and retained within the booklet assembly 200, and the cable assembly 230 is inserted into the cable connector 206 and retained in an inserted position by the carriage 250. The inserted position may be understood to include a position, such as that depicted in FIG. 2, where the connector jack 236 is mated to the cable connector 206 such that electronic communication between the cable assembly 230 and the card 204 is enabled.

Enabling insertion and retention of the cassette 220 into the booklet assembly 200, the cassette 220 includes a plurality of tabs. The plurality of tabs is configured for releasably interlocking with the booklet assembly 200. More specifically, in an embodiment depicted in FIGS. 2-4C, the cassette 220 includes a left tab and a right tab. The left tab includes a left tab handle region 262L, a left tab bend region 264L, and a left tab fulcrum region 266L. The right tab includes a right tab handle region 262R, a right tab bend region 264R, and a right tab fulcrum region 266R. In a depicted embodiment, each tab is a single piece together with the corresponding lever, retained by the fasteners 402. Specifically, the left tab fulcrum region 266L and right tab fulcrum region 266R may be understood as affixed internally to the cassette 220, as depicted. In alternative embodiments, the levers and tabs may be distinct structures.

Referring still to an embodiment depicted in FIG. 2-4C, the left tab bend region 264L may extend through the cassette left panel gap 224A, and the right tab bend region 264R may extend through the cassette right panel gap 225A. The left tab handle region 262L extends through the cassette rear panel left gap 263L, and the right tab handle region 262R extends through the cassette rear panel right gap 263R. The left tab is urged toward the cassette left panel 224 by spring action of the left tab fulcrum region 266L, and the right tab is urged toward the cassette right panel 225 by spring action of the right tab fulcrum region 266R. Thus, the tabs may be understood to be spring-loaded. The left tab is urgable away from the cassette left panel 224 by actuation of the left tab handle region 262L (for example, manual pushing rightward by a human user of the left tab handle region 262L). The right tab is urgable away from the cassette right panel 225 by actuation of the right tab handle region 262R (for example, manual pushing leftward by a human user of the right tab handle region 262R). Thus, each of the plurality of tabs may be understood as actuated by a lever. Resultingly, the left tab bend region 264L and right tab bend region 264R may be configured to engage with corresponding structures interior to the booklet assembly 200 such that, if inserted into the booklet assembly 200, the cassette 220 is retained by the left tab bend region 264L and right tab bend region 264R snapping into place. Similarly, the cassette 220 is releasable from the booklet assembly 200 by a user actuating both the left tab handle region 262L and right tab handle region 262R, whereby the left tab bend region 264L and right tab bend region 264R disengage from the booklet assembly 200, releasing the cassette 220 therefrom. Thus, via the left and right tabs, the cassette 220 may be understood as configured for insertion into the booklet assembly 200.

Referring still to an embodiment depicted in FIG. 2-4C, FIG. 3B presents an optional light pipe 370 affixed internally to the cassette 220. A light source 207 (shown in FIG. 2) may be affixed to the cable connector 206. The light source 207 may be a status indicator, such as Light Emitting Diode (LED) that is configured to blink or otherwise present status information pertaining to the card 204. The light source 207 may not, on its own, be visible from outside the device cabinet 170. Addressing this in a depicted embodiment, the light pipe 370 includes a first end 207A located at a light collection position whereat, if the cassette 220 is inserted into the booklet assembly 200, light emitted by the light source 207 is collected by the light pipe. That is, the first end 370A may be located proximate to the light source 207. The light pipe 370 further includes a second end 370B located at a light emission position whereat light emitted from the light pipe 370 unobstructedly propagates out of the cassette 220. That is, the second end 370B is located at the back of the cassette and is visible from outside of the device cabinet 170. The light pipe 370 may be made of acrylic, glass, or other transparent but internally reflective material. The light pipe 370 may be affixed to the interior of the cassette 220 by adhesives, snap components, or other fasteners, and may be arranged on a path through the cassette 220 that avoids various other components. For example, the light pipe 370 may pass under a notch 358A in a lever arm region 358 (corresponding to the right lever arm region 258R and left lever arm region 258L).

Referring still to an embodiment depicted in FIGS. 2-4C, a method of using the apparatus of the invention includes preloading the cable assembly 230 into the carriage 250. To achieve this, the cable head assembly 234 may be pressed into carriage 250 such that the hook structures 252L, 252R, 254L, and 254R snap around the cable head assembly 234. The method further includes inserting the cassette 220 into the booklet assembly 200. For example, the cassette 220 may be pressed into the booklet assembly 200 until the left tab bend region 264L and right tab bend region 264R snap into place. The method further includes configuring the carriage 250 such that the cable assembly 230 is inserted into the cable connector 206 and retained in the inserted position by the carriage 250, for example by adjusting the position of the carriage 250 along the insertion dimension 400. The method may further include inserting the booklet assembly 200 into the device cabinet 170 such that the backplane connector 208 is inserted into the backplane socket 172.

Figure 5:
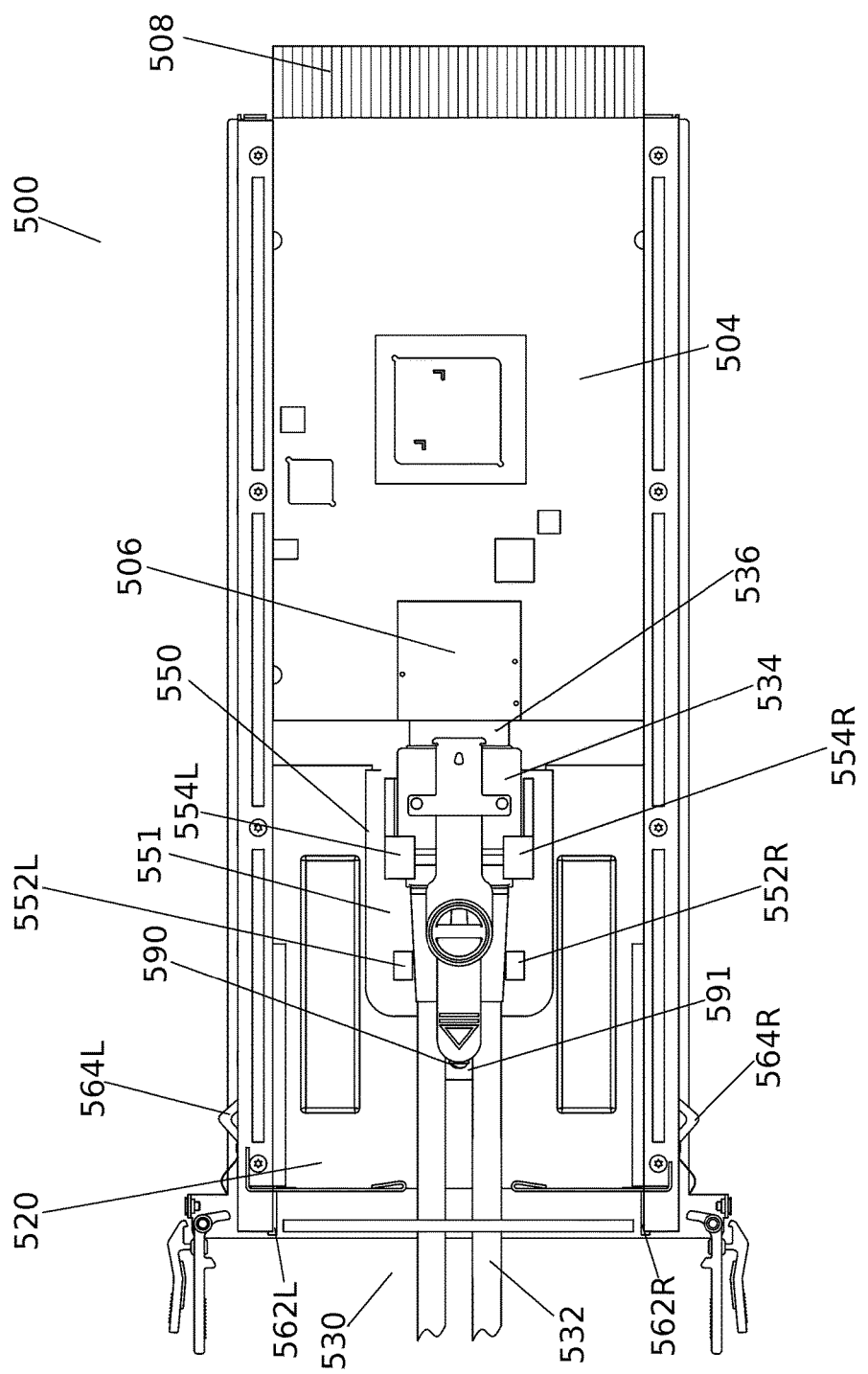
FIG. 5 is a plan view of a cable assembly, cassette with jack screw carriage retainer, and reduced form factor card, in accordance with at least one embodiment of the invention.
Figure 6A:
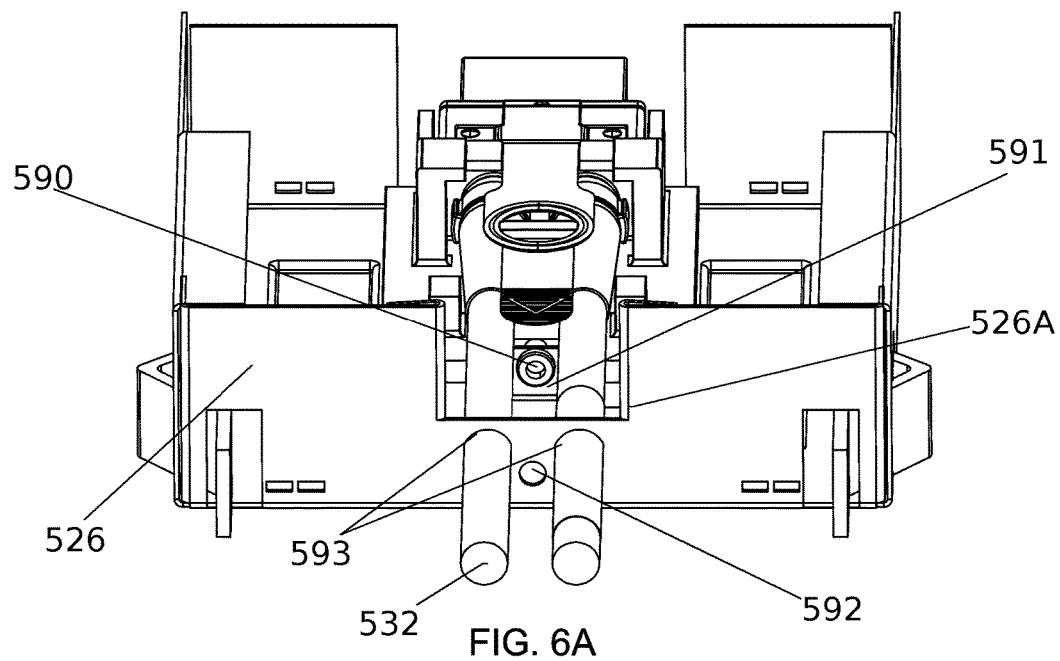
FIG. 6A is an elevated rear perspective view of a cable assembly and cassette with jack screw carriage retainer, in accordance with at least one embodiment of the invention.
Figure 6B:
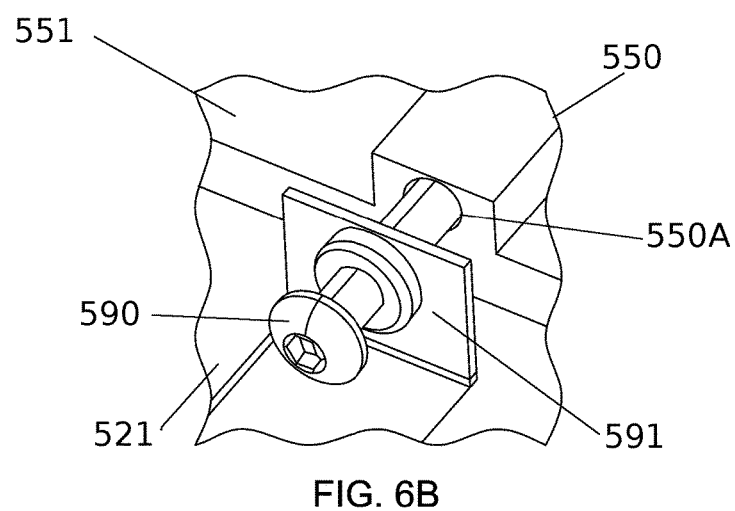
FIG. 6B is a close-up, elevated rear-right perspective view of a jack screw, in accordance with at least one embodiment of the invention.

Referring now to an embodiment depicted in FIGS. 5-6B, the booklet assembly 500 includes a card 504 with a cable connector 506 and backplane connector 508, similarly to the previously described embodiments. The cable assembly 530, cable 532, cable head assembly 534, and connector jack 536 likewise function similarly to the previously described embodiments. The cassette 520, cassette base 521, carriage 550, carriage panel top face 551, hooks 552L, 552R, 554L, and 554R, tab bend regions 564L and 564R, and tab handle regions 562L, and 562R likewise function similarly to previously described embodiments.

In an embodiment depicted in FIGS. 5-6B, the cassette 520 includes a jack screw 590. The jack screw 590 rotates within a jack screw retainer 591 resulting in adjustable translational motion along the insertion dimension 400. The jack screw retainer 591 is affixed to or incorporated into the cassette base 521. By the jack screw retainer 591, the jack screw 590 may be understood to be mounted internally to the cassette 520 such that the jack screw 590 is rotatable about and translatable along the insertion dimension 400. The jack screw 590 may engage with a receiving structure 550A affixed to or incorporated into the carriage 550. By rotating the jack screw, users may adjust the degree to which the carriage 550 is urged along the insertion dimension 400. Thus, the jack screw 590 may be understood to be configured to urge the carriage along the insertion dimension 400 such that the cable assembly is urged into an inserted position. Equivalently, the jack screw 590, together with the jack screw retainer 591 and receiving structure 550A may be understood to be an urging means for urging the connector jack 536 into the cable connector 506.

Referring still to an embodiment depicted in FIGS. 5-6B, the cassette rear panel center gap 526A in the cassette rear panel 526 may be reduced, as shown, leaving a panel through which the cable 532 may pass via one or more holes. An additional central hole 592 may permit a user to insert a screwdriver to access the jack screw 590.

Figure 7:
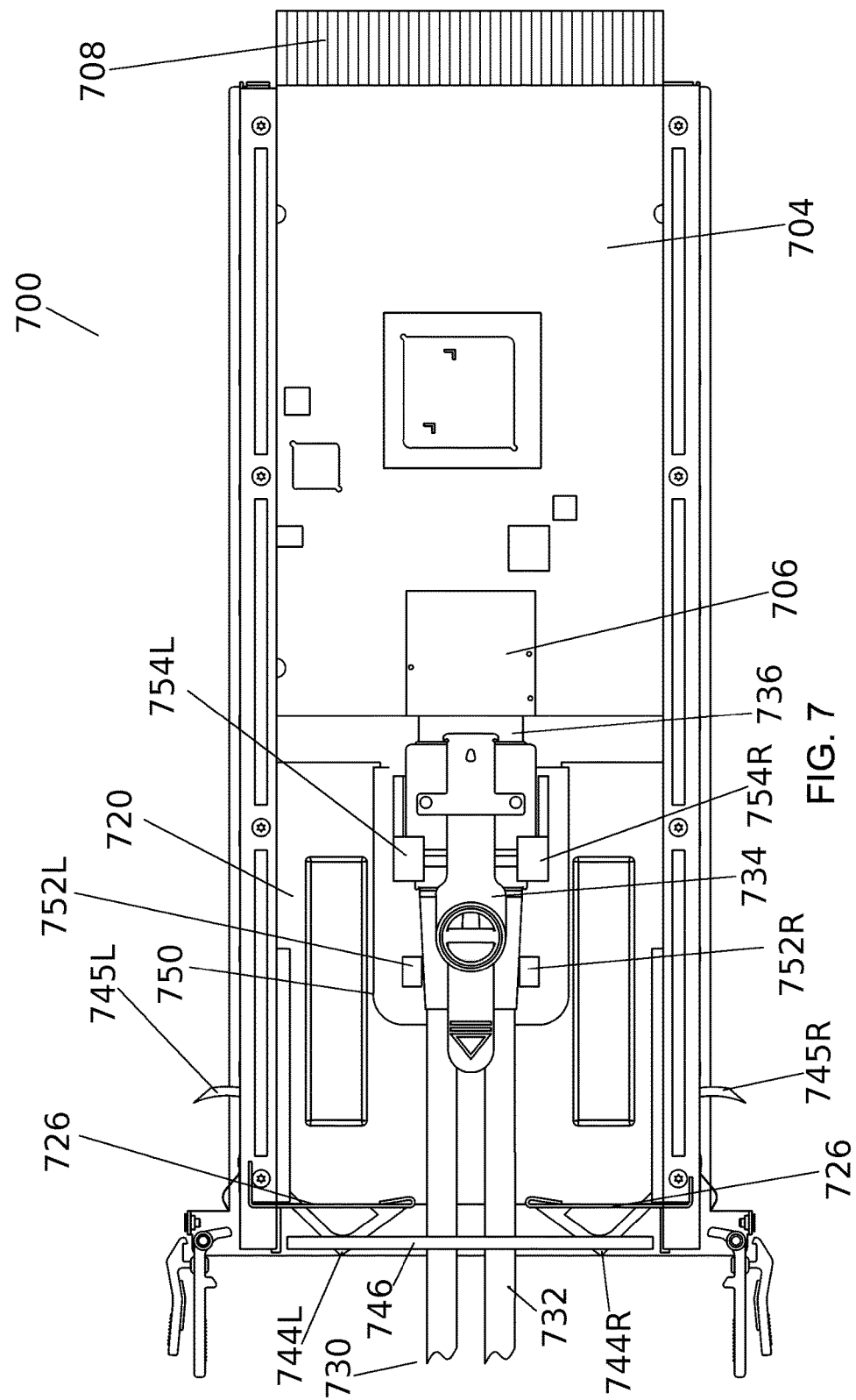
FIG. 7 is a plan view of a cable assembly, cassette with fixed carriage, and reduced form factor card, in accordance with at least one embodiment of the invention.
Figure 8:
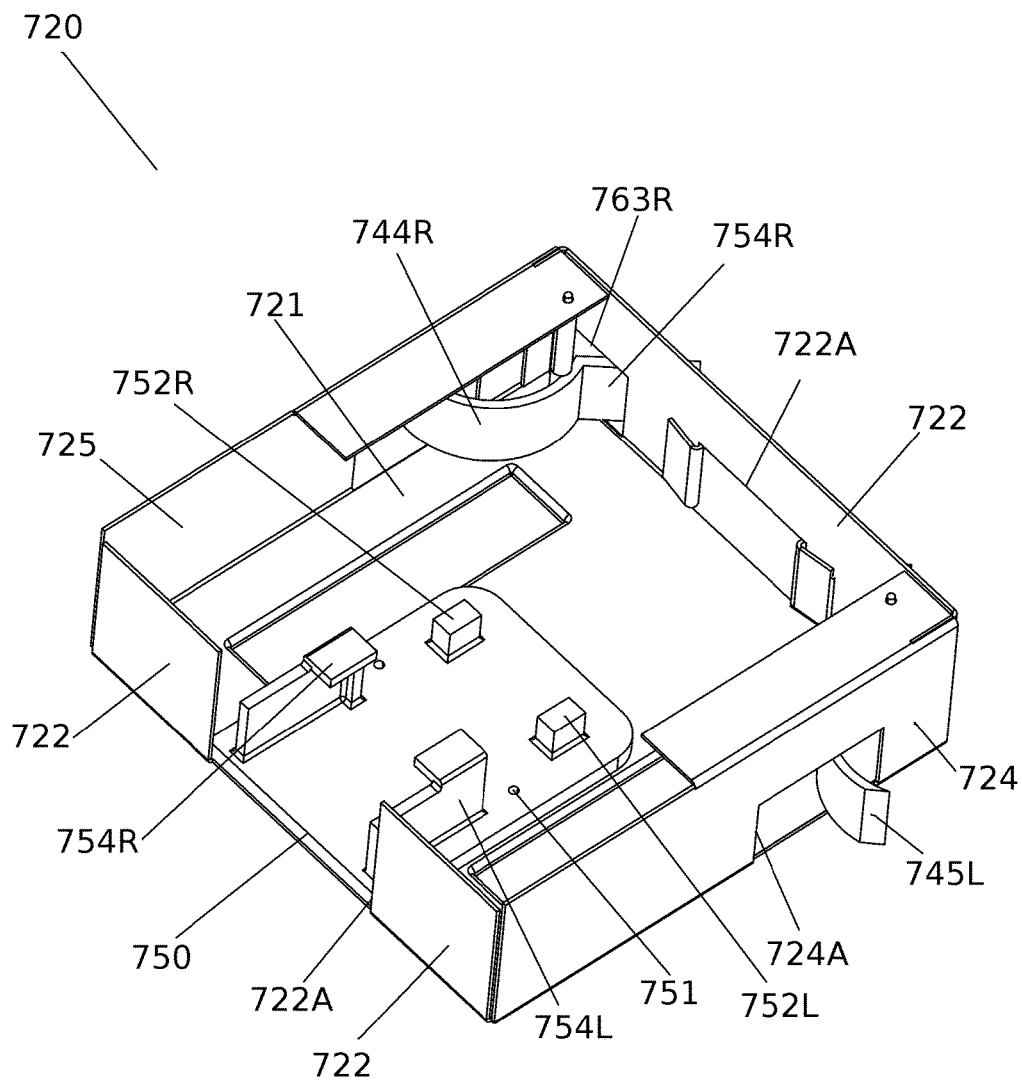
FIG. 8 is an elevated right-rear perspective view of a cassette with fixed carriage, in accordance with at least one embodiment of the invention.

Referring now to an embodiment depicted in FIGS. 7-8, the booklet assembly 700 includes a card 704 with a cable connector 706 and backplane connector 708, similarly to the previously described embodiments. The cable assembly 730, cable 732, cable head assembly 734, and connector jack 736 likewise function similarly to the previously described embodiments. The cassette 720, cassette base 721, carriage 750, and hooks 752L, 752R, 754L likewise function similarly to previously described embodiments.

In an embodiment depicted in FIG. 6-8, the carriage 750 is not slidable relative to the cassette 720, but rather is affixed to the cassette base 721 via fasteners 751, which may include screws, nails, bolts, rivets, snapping structures, adhesives, hook-and-loop fabric, etc. Thus, the carriage 752 is fixedly positioned within the cassette 720. In addition, an embodiment of FIG. 7-8 may replace the tabs with retaining hooks 744R and 744L, each including a retaining hook tip 745R and 745L, which pass through the right and left panel gaps 725A and 724A to engage with corresponding structures on the interior of the booklet assembly 700. In addition, the retaining hooks exert tension between the cassette 720 and a booklet back panel 746, thus urging the entire cassette 720 forward along the insertion dimension 400 such that the connector jack 736 is urged into the cable connector 706. Thus the retaining hooks 744L and 744R may be understood to be an urging means for urging the connector jack 736 into the cable connector 706.

What is claimed is:

1. An apparatus comprising:
   a cassette;
   said cassette comprising a cassette base;
   said cassette base comprising a cassette base top surface, a cassette base front edge, a cassette base rear edge, a cassette base right edge, and a cassette base left edge;
   said cassette further comprising a cassette front panel, a cassette rear panel, a cassette right panel, and a cassette left panel;
   said cassette front panel being affixed to said cassette base front edge, orthogonal to said cassette base top surface;
   said cassette rear panel being affixed to said cassette base rear edge, orthogonal to said cassette base top surface;
   said cassette right panel being affixed to said cassette base right edge, orthogonal to said cassette base top surface;
   said cassette left panel being affixed to said cassette base left edge, orthogonal to said cassette base top surface;
   said cassette front panel comprising a front panel gap cut therefrom;
   said cassette further comprising a carriage;
   said carriage comprising a carriage panel;
   said carriage panel comprising a carriage panel top face and a carriage panel bottom face;
   said carriage further comprising at least one hook structure affixed to said carriage panel top face;
   said carriage being retained to said cassette base such that said cassette base top surface opposes said carriage panel bottom face;
   said front panel gap and said carriage being aligned along an insertion dimension;
   said cassette right panel comprises a cassette right panel gap cut therefrom;
   said cassette left panel comprises a cassette left panel gap cut therefrom;
   said cassette rear panel comprises a cassette rear panel right gap, a cassette rear panel central gap, and a cassette rear panel left gap cut therefrom;
   said cassette further comprises a left tab and a right tab thereto;
   said left tab comprises a left tab fulcrum region, a left tab bend region, and a left tab handle region;
   said right tab comprises a right tab fulcrum region, a right tab bend region, and right tab handle region;
   said left tab fulcrum region is affixed internally to said cassette;
   said right tab fulcrum region is affixed internally to said cassette;
   said left tab bend region extends through said cassette left panel gap;
   said right tab bend region extends through said cassette right panel gap;
   said left tab handle region extends through said cassette rear panel left gap;
   said right tab handle region extends through said cassette rear panel right gap;
   said left tab being urged toward said cassette left panel by spring action of said left tab fulcrum region;
   said right tab being urged toward said cassette right panel by spring action of said right tab fulcrum region;
   said left tab being urgable away from said cassette left panel by actuation of said left tab handle region; and
   said right tab being urgable away from said cassette right panel by actuation of said left tab handle region.

2. An apparatus comprising:
   a cassette;
   said cassette comprising a cassette base;
   said cassette base comprising a cassette base top surface, a cassette base front edge, a cassette base rear edge, a cassette base right edge, and a cassette base left edge;
   said cassette further comprising a cassette front panel, a cassette rear panel, a cassette right panel, and a cassette left panel;
   said cassette front panel being affixed to said cassette base front edge, orthogonal to said cassette base top surface;
   said cassette rear panel being affixed to said cassette base rear edge, orthogonal to said cassette base top surface;
   said cassette right panel being affixed to said cassette base right edge, orthogonal to said cassette base top surface;
   said cassette left panel being affixed to said cassette base left edge, orthogonal to said cassette base top surface;
   said cassette front panel comprising a front panel gap cut therefrom;
   said cassette further comprising a carriage;
   said carriage comprising a carriage panel;
   said carriage panel comprising a carriage panel top face and a carriage panel bottom face;
   said carriage further comprising at least one hook structure affixed to said carriage panel face;
   said carriage being retained to said cassette base such that said cassette base top surface opposes said carriage panel bottom face;
   said front panel gap and said carriage being aligned along an insertion dimension;
   said cassette base comprises a slot cut therefrom, said slot comprising a first slot region and a second slot region;
   said first slot region being of greater width than said second slot region;
   said carriage further comprising a tongue affixed to said carriage panel bottom face;
   said tongue comprising a narrow region and an enlarged region;
   said narrow region being affixed between said enlarged region and said carriage panel bottom face;
   said enlarged region being of lesser width than said first slot region and greater width than said second slot region; and said narrow region being of lesser width than said second slot region;

whereby said tongue is insertable into said first slot region and slidable into said second slot region such that, when said tongue is disposed within said second slot region, said carriage is retained to said cassette base slidably, along said insertion dimension.

3. The apparatus of claim 2, wherein:

said cassette further comprises a left lever and a right lever;

said left lever comprises a left lever fulcrum region and a left lever arm region;

said right lever comprises a right lever fulcrum region and a right lever arm region;

said left lever are affixed internally to said cassette via said left lever fulcrum region;

said right lever are affixed internally to said cassette via said right lever fulcrum region; and said right lever arm region and said left lever arm region are configured to urge said carriage forward along said insertion dimension.

* * * * *